United States Patent
Mutter et al.

(10) Patent No.: US 11,546,188 B2
(45) Date of Patent: Jan. 3, 2023

(54) TRANSCEIVER DEVICE FOR A BUS SYSTEM AND OPERATING METHOD THEREFOR

(71) Applicant: Robert Bosch GmbH, Stuttgart (DE)

(72) Inventors: Arthur Mutter, Neuhausen (DE); Steffen Walker, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 16/976,776

(22) PCT Filed: Mar. 5, 2019

(86) PCT No.: PCT/EP2019/055364
§ 371 (c)(1),
(2) Date: Aug. 31, 2020

(87) PCT Pub. No.: WO2019/174959
PCT Pub. Date: Sep. 19, 2019

(65) Prior Publication Data
US 2021/0014083 A1 Jan. 14, 2021

(30) Foreign Application Priority Data
Mar. 12, 2018 (DE) .......................... 102018203707.8

(51) Int. Cl.
*H04L 12/413* (2006.01)
*H04L 12/40* (2006.01)
*H04L 25/02* (2006.01)

(52) U.S. Cl.
CPC .... *H04L 12/4135* (2013.01); *H04L 12/40013* (2013.01); *H04L 12/4013* (2013.01); *H04L 25/0272* (2013.01); *H04L 2012/40215* (2013.01)

(58) Field of Classification Search
None
See application file for complete search history.

(56) References Cited

U.S. PATENT DOCUMENTS

2010/0177829 A1* 7/2010 Suzuki ............... H04L 25/0278
375/257
2011/0185093 A1* 7/2011 Matsuo ............... H04L 12/403
710/110

(Continued)

FOREIGN PATENT DOCUMENTS

CN 101540627 A 9/2009
CN 102622325 A 8/2012

(Continued)

OTHER PUBLICATIONS

International Search Report for PCT/EP2019/055364, dated Oct. 4, 2019.

*Primary Examiner* — Gregory B Sefcheck
*Assistant Examiner* — Suk Jin Kang
(74) *Attorney, Agent, or Firm* — Norton Rose Fulbright US LLP; Gerard Messina

(57) ABSTRACT

A transceiver device for a bus system. The transceiver device includes first and second bus terminals for connection to first and second signal line of the bus system, and a transmitting unit for outputting a bus transmission signal to the first and second bus terminals. The transceiver device includes an input connection for receiving a transmission input signal useable for controlling an operating state of the transmitting unit, and a detection device, which to detect the presence of a first predefinable condition and, if the first predefinable condition is present, to interconnect the first and second bus terminals via a predefinable electrical resistance for a predefinable first period of time.

13 Claims, 6 Drawing Sheets

(56) References Cited

U.S. PATENT DOCUMENTS

| | | | | |
|---|---|---|---|---|
| 2011/0199131 A1* | 8/2011 | Boezen | ............... | H04L 25/028 |
| | | | | 327/109 |
| 2011/0285424 A1* | 11/2011 | Suzuki | ............... | H03K 17/0822 |
| | | | | 327/50 |
| 2018/0198443 A1* | 7/2018 | Mori | ............... | H03K 17/164 |
| 2019/0058614 A1* | 2/2019 | de Haas | ............... | H04L 69/18 |
| 2019/0097681 A1* | 3/2019 | Honda | ............... | H04L 25/02 |
| 2019/0229726 A1* | 7/2019 | Lecce | ............... | H03K 17/102 |
| 2019/0272248 A1* | 9/2019 | Metzner | ............... | G06F 13/4022 |
| 2019/0327005 A1* | 10/2019 | Tomita | ............... | H04B 15/005 |
| 2019/0385057 A1* | 12/2019 | Litichever | ............... | H04L 63/14 |
| 2021/0350237 A1* | 11/2021 | Litichever | ............... | G06N 3/08 |

FOREIGN PATENT DOCUMENTS

| | | |
|---|---|---|
| DE | 102009008182 A1 | 10/2009 |
| DE | 102015222334 A1 | 5/2017 |
| JP | 2016034080 A | 3/2016 |
| JP | 2017158180 A | 9/2017 |

\* cited by examiner

TRANSCEIVER DEVICE FOR A BUS SYSTEM AND OPERATING METHOD THEREFOR

FIELD

The present invention relates to a transceiver device for a bus system, the transceiver device including a first bus terminal for connection to a first signal line of the bus system, a second bus terminal for connection to a second signal line of the bus system and a transmitting unit for outputting a bus transmission signal to the first and second bus terminals.

The present invention further relates to a method for operating such a transceiver device.

BACKGROUND INFORMATION

A device and a method are described in DE 102015222334A1 for selectively masking bus oscillations when receiving data via a bus system. The conventional device provides a masking element for masking oscillations of the bus signal. The masking element is comparatively complex.

SUMMARY

It is an object of the present invention to improve a transceiver device of the aforementioned type and an operating method therefor to the extent that the aforementioned disadvantages of the related art are reduced or avoided.

In accordance with an example embodiment of the present invention, a transceiver device for a bus system is provided, the transceiver device including a first bus terminal for connection to a first signal line of the bus system, a second bus terminal for connection to a section signal line of the bus system and a transmitting unit for outputting a bus transmission signal to the first and second bus terminals, the transceiver device including an input terminal for receiving a transmission input signal usable for controlling an operating state of the transmitting unit, the transceiver device including a detection device, which is designed to detect the presence of a first predefinable condition and, if the first predefinable condition is present, to interconnect the first and second bus terminals via a predefinable electrical resistance or with an impedance for a predefinable first period of time, the predefinable first condition including at least one of the following elements: a) a rising edge of the transmission input signal and/or of a signal derived therefrom, b) a state transition of the transmitting unit from an operating state in which the first and second bus terminals are driven into an operating state in which the first and second bus terminals are not driven.

This advantageously enables a reduction of undesirable bus oscillations without the requirement of a comparatively complex masking unit as it is in the related art. With the rising edge of the transmission input signal, it may be advantageously detected that an operating state results in which the undesirable bus oscillations may occur. With the connection of the bus terminals with the aid of the predefinable electrical resistance for the predefinable first period of time, it is possible to advantageously reduce potentially occurring bus oscillations, because in the first period of time a greater attenuation results due to the connected resistance.

Alternatively or in addition to the evaluation of the rising edge of the transmission input signal, a state transition of the transmitting unit from an operating state in which the first and second bus terminals are driven into an operating state in which the bus terminals are non-driven may also be evaluated in order to detect that an operating state results, in which undesirable bus oscillations may occur. A driven operating state of the transmission unit is characterized, for example, in that the transmission unit applies a respective predefinable electrical reference potential to one or multiple bus terminals. This may take place, for example, by connecting the first and/or second bus terminal to a circuit nodal point that exhibits the corresponding reference potential. In contrast, a non-driven operating state of the transmission unit is characterized, for example, in that the transmission unit does not apply a predefinable electrical reference potential to the bus terminals, but assumes a comparatively high-impedance state, for example.

In preferred specific embodiments of the present invention, the transmission input signal is evaluated in terms of the first predefinable condition, because the rising edge thereof usually occurs chronologically before the change in operating state from the driven state into the non-driven state, so that the attenuation according to the specific embodiments may be activated at an early stage accordingly with the aid of the predefinable resistance.

In further specific embodiments of the present invention, the detection unit is designed to detect the presence of a second predefinable condition, the second predefinable condition describing that a data phase of a data frame to be emitted with the aid of the transmitting unit is present, the transceiver being designed to interconnect the first and second bus terminals via the predefinable electrical resistance for the predefinable first period of time if the first predefinable condition and the second predefinable condition are present. This enables the connection of the predefinable resistance and thus the attenuation of undesirable bus oscillations to be carried out during the data phase of the data frame. This is advantageous, for example, in particular, when transmissions on the bus system during the data phase exhibit a comparatively high transmission rate, for example, bit rate.

In some specific embodiments of the present invention, the connection of the predefinable resistance between the bus terminals outside the data phase may be omitted namely, even if the first predefinable condition is present. This is the case, for example, in specific embodiments, in which an arbitration phase taking place outside of the data phase, in particular, before the data phase, which regulates, in particular, a bus access, provides a comparatively low transmission rate. With the comparatively low transmission rate of the arbitration phase, the bus oscillations invariably undesirable per se do not interfere to such a degree with the data transmission as is the case during a data phase having a comparatively high transmission rate. In other words, the connection of the predefinable resistance in some specific embodiments may take place specifically in such operating phases (for example, data phase), in which the connection is particularly useful for the signal transmission. According to further specific embodiments, no connection of the predefinable resistance may accordingly take place outside these operating phases, so that outside these operating phases, an impedance of the terminals with respect to the bus lines remains unchanged.

In further specific embodiments of the present invention, a receiving unit is provided for receiving a bus receive signal from the first and second bus terminals and for outputting a received output signal as a function of the bus receive signal. In this way, signals received via the bus system, the bus receive signals, may be received by the transceiver.

In further specific embodiments of the present invention, it is provided that the detection device is designed to detect the presence of a third predefinable condition, the third predefinable condition including at least one of the following elements: a) a change of state of the bus receive signal from a driven state into a non-driven state, b) a falling edge of a differential signal derived from the bus receive signal with the aid of the receiving unit, c) a rising edge of the received output signal, the transceiver being designed to interconnect the first and second bus terminals via the predefinable electrical resistance for the predefinable first period of time, if at least the first predefinable condition and the third predefinable condition are present. This enables a particularly reliable activation of the predefinable resistance in those phases in which the oscillations may occur. For example, it may be deduced from a change of state of the bus receive signal from the driven state into the non-driven state and from the simultaneous presence of the first predefinable condition (for example, rising edge of the transmission input signal), that an edge change of the transmission input signal was desired by the transceiver and the edge change was also actually implemented by the transmitting unit on the bus terminals. This results in a high robustness against interference pulses and glitches present in real systems.

Comparable pieces of information in further specific embodiments of the present invention may be ascertained from the falling edge of the differential signal derived from the bus receive signal with the aid of the receiving unit and/or from a rising edge of the received output signal.

In further specific embodiments of the present invention, it is also possible that the transceiver device is designed to interconnect the first and second bus terminals via the predefinable electrical resistance for the predefinable first period of time if the first predefinable condition and the second predefinable condition and the third predefinable condition are present, thus, all three predefinable conditions are present.

In further specific embodiments of the present invention, the predefinable electrical resistance has a value between 40 ohms and approximately 200 ohms, preferably between approximately 80 ohms and approximately 160 ohms, further preferably between 100 ohms and approximately 140 ohms, more particularly preferably approximately 120 ohms. This results in a particularly efficient attenuation of undesirable bus oscillations due to the connection of the predefinable electrical resistance and simultaneously the comparatively minimal influence of a bus system or of other bus users potentially connected to the bus terminals of the transceiver device.

In further specific embodiments of the present invention, the detection device includes at least one AND gate for linking signals that characterize in each case at least one predefinable condition.

Further aspects of the specific embodiments of the present invention are specified by a user station for a bus system including at least one transceiver device.

Further aspects of the specific embodiments of the present invention are specified by a bus system including a bus line, which includes at least one first signal line and at least one second signal line, and including at least two user stations, at least one of the at least two user stations including at least one transceiver device.

Further aspects of the specific embodiments of the present invention are specified by a method for operating a transceiver device for a bus system. Advantageous refinements are described herein.

Further features, potential applications and advantages of the present invention result from the following description of exemplary embodiments of the present invention, which are depicted in the figures. All described or depicted features in and of themselves or in arbitrary combination form the subject matter of the present invention, regardless of their wording or representation in the description or in the figures.

DETAILED DESCRIPTION OF EXAMPLE EMBODIMENTS

Figure 1:
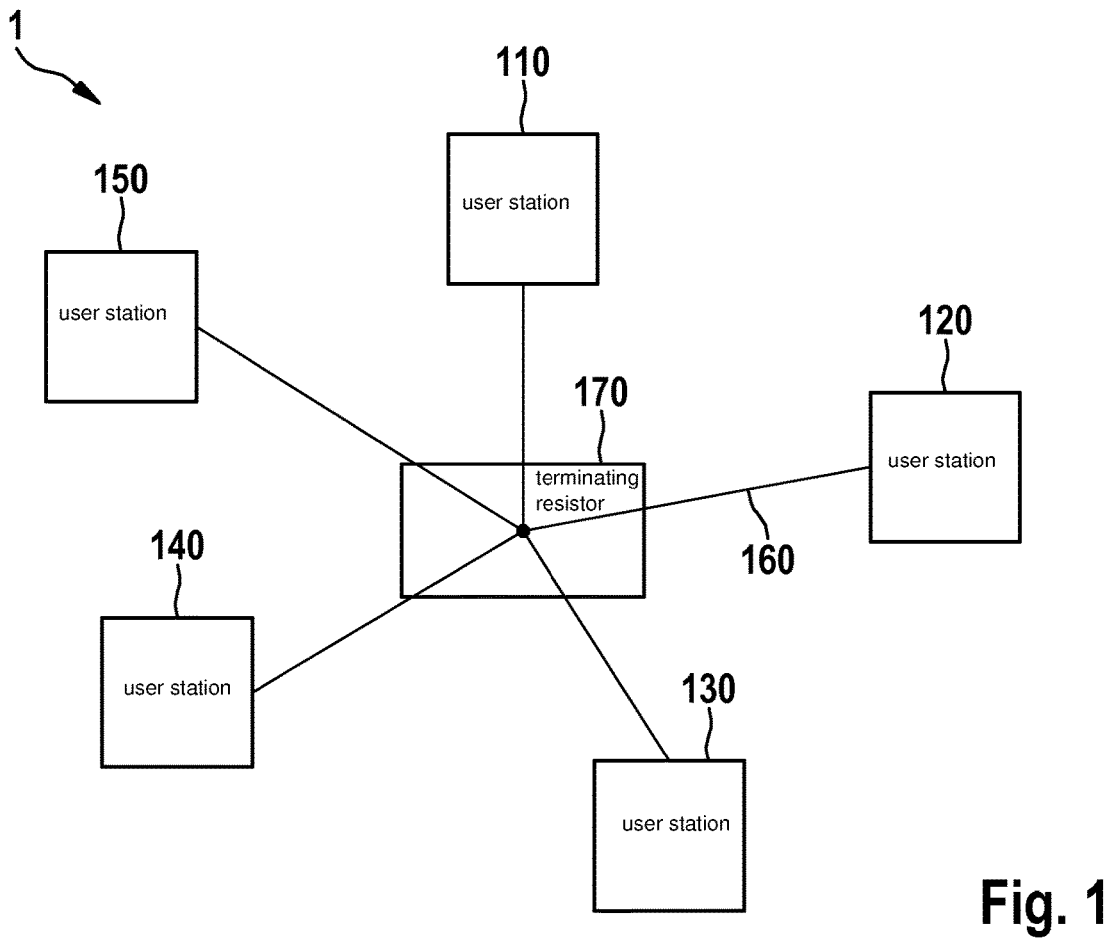
FIG. 1 schematically shows a simplified block diagram of a bus system according to one specific embodiment of the present invention.

FIG. 1 schematically shows a simplified block diagram of a bus system 1 according to one specific embodiment of the present invention, which may be used in a vehicle, in particular, in a motor vehicle, an aircraft, etc. or in an industrial robot, etc. Bus system 1 in FIG. 1 has a first user station 110, a second user station 120, a third user station 130, a fourth user station 140, a fifth user station 150, a bus line 160 and a terminating resistor 170, user stations 110 through 150 being situated in a star-shaped topology. Bus system 1 may, for example, be a CAN bus system or a CAN FD bus system, etc. Bus system 1 in the present exemplary embodiment is designed, in general, for a communication in which at least an exclusive, collision-free access of one of user stations 110 through 150 to bus line 160 is at least temporarily ensured. First user station 110 may, for example, be a control unit of a motor vehicle. Second, fourth and fifth user stations 120, 140, 150 may, for example, each be a sensor of the motor vehicle. Third user station 130 may, for example, be a display device of a motor vehicle.

Figure 2:
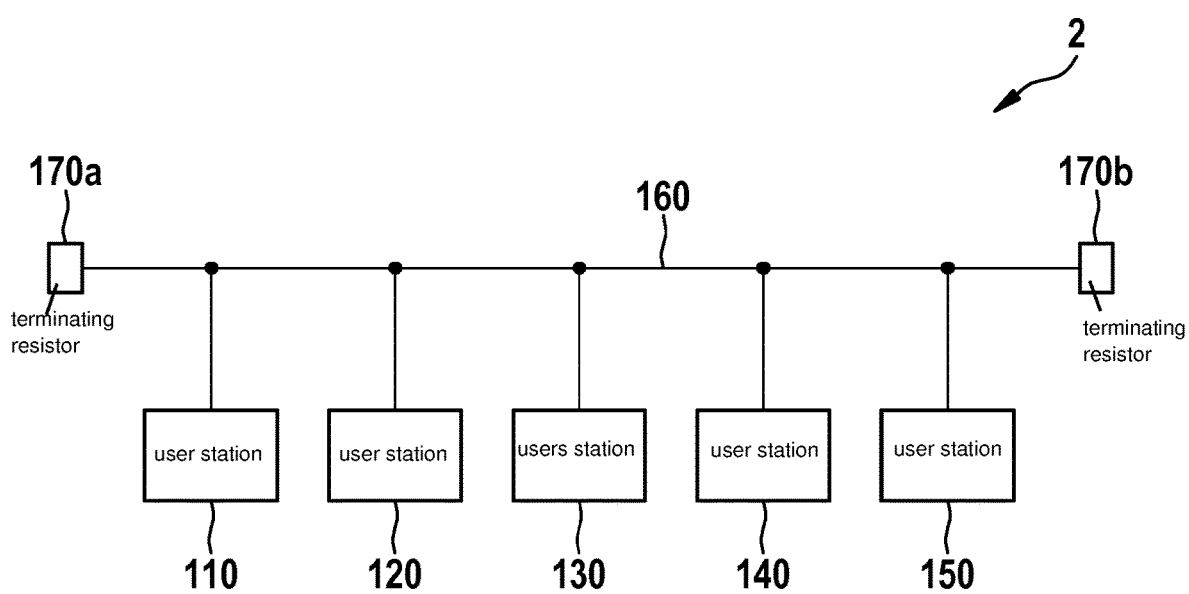
FIG. 2 schematically shows a simplified block diagram of a bus system according to one further specific embodiment of the present invention.

FIG. 2 shows a bus system 2 according to one further exemplary embodiment. In contrast to bus system 1 according to the first exemplary embodiment, however, bus system 2 according to the second exemplary embodiment has a linear bus topology including two terminating resistors 170a, 170b at each end of bus line 160. User stations 110 through 150 in bus system 2 according to FIG. 2 may be structured in the same way as in FIG. 1.

Figure 3:
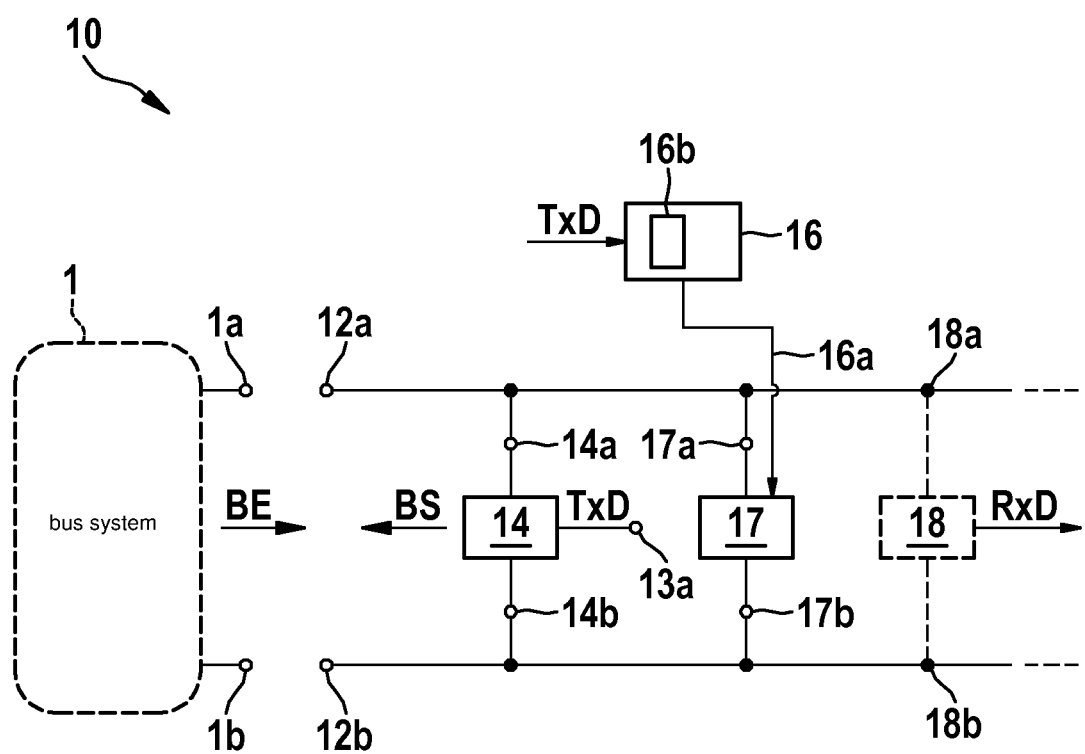
FIG. 3 schematically shows a block diagram of a transceiver device according to one specific embodiment of the present invention.

FIG. 3 schematically shows a block diagram of a transceiver device 10 for a bus system according to one specific embodiment. For example, transceiver device 10 described below with reference to FIG. 3 may be used in at least one user station 110, . . . , 150 of bus systems 1, 2 described above with reference to FIGS. 1, 2.

Transceiver device 10 includes a first bus terminal 12a for connection to a first signal line 1a of bus system 1 schematically indicated in FIG. 3, and a second bus terminal 12b for connection to a second signal line 1b of bus system 1. For example, bus line 160 (FIG. 1) therefore includes the two signal lines 1a, 1b.

Transceiver device 10 further includes a transmitting unit 14 for outputting a bus transmission signal BS to first and second bus terminals 12a, 12b, for example, for transmitting pieces of information via bus line 160 to other user stations or to their respective transceiver devices (not shown), and an input terminal 13a for receiving a transmission input signal TxD usable for controlling an operating state of transmitting unit 14. Transmitting unit 14 is preferably connected via its clamps or terminals 14a, 14b to bus terminals 12a, 12b.

Transceiver device 10 further includes a detection device 16, which is designed to detect the presence of a first predefinable condition and, if the first predefinable condition is present, to interconnect first and second bus terminals 12a, 12b via a predefinable electrical resistance for a predefinable first period of time, as a result of which undesirable bus oscillations may be systematically attenuated.

In preferred specific embodiments, the predefinable first condition includes the presence of a rising edge of transmission input signal TxD. To check whether the aforementioned rising edge of transmission input signal TxD is present, the transmission input signal TxD and or a signal derived therefrom may be fed in preferred specific embodiments to detection device 16. In the present case, this is indicated in FIG. 3 by arrow TxD pointing to detection device 16. Accordingly, once detection device 16 detects the presence of the first predefinable condition as a function of the rising edge of transmission input signal TxD, resistance device 17 depicted in FIG. 3, for example, may be controlled with the aid of a control signal 16a emanating from detection device 16 in such a way that the aforementioned predefinable resistance is connected between bus terminals 12a, 12b.

In preferred specific embodiments of the present invention, resistance device 17 with its clamps or terminals 17a, 17b may be connected for this purpose permanently, for example, to bus terminals 12a, 12b. Resistance device 17 may, as schematically shown by way of example in FIG. 8, include an electrical resistance R having a value between approximately 40 ohms and approximately 200 ohms, preferably between approximately 80 ohms and approximately 160 ohms, further preferably between 100 ohms and approximately 140 ohms, in particular preferably with approximately 120 ohms, as well as a switch 17c situated in series for this purpose, which is controllable by a control signal, in the present case, for example, with the aid of control signal 16a provided with the aid of detection device 16. In other specific embodiments, resistance device 17 may, for example, also include a semiconductor component, in particular, a field effect transistor or the like, the drain-source path of which is controllable by the action of control signal 16a, for example, between a high-impedance state ("no attenuation resistance connected") and an operating state including a resistance of the drain-source path in the aforementioned range, for example, of approximately 120 ohms.

In further preferred specific embodiments of the present invention, the predefinable first condition includes the presence of a rising edge of a signal derived from the transmission input signal TxD. In still further preferred specific embodiments, the predefinable first condition includes a state transition of transmitting unit 14 from an operating state in which first and second bus terminals 12a, 12b are driven, into an operating state in which first and second bus terminals 12a, 12b are not driven. This may be ascertained, for example, as a function of a parameter of transmitting unit 14 and/or by a signal present between bus terminals 12a, 12b, for example, with the aid of an optional receiving unit 18, which is connectable or is connected via terminals 18a, 18b to bus terminals 12a, 12b.

Figure 5A:
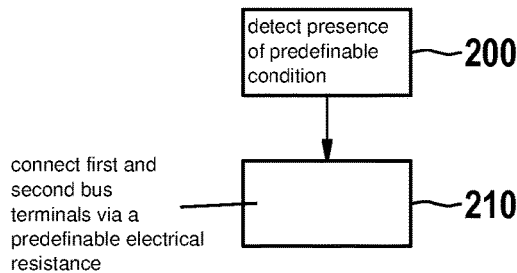
FIG. 5A shows a simplified flow chart of a method according to one specific embodiment of the present invention.

For this purpose, FIG. 5A shows a simplified flow chart of the method according to an example embodiment of the present invention. In step 200, the presence of the first predefinable condition is detected with the aid of detection device 16 (FIG. 3). In subsequent step 210 (FIG. 5A), the predefinable electrical resistance R is connected between bus terminals 12a, 12b, for example, while activating resistance device 17 with the aid of control signal 16a (FIG. 3).

In further specific embodiments of the present invention, detection device 16 is designed to detect the presence of a second predefinable condition, the second predefinable condition describing that a data phase of a data frame to be emitted with the aid of transmitting unit 14 is present, transceiver device 10 being designed to interconnect first and second bus terminals 12a, 12b via predefinable electrical resistance R (FIG. 8) for the predefinable first period of time, if the first predefinable condition and the second predefinable condition are present.

This makes it possible to connect predefinable resistance R and thus to carry out the attenuation of undesirable bus oscillations during the data phase of the data frame. This is particularly advantageous, for example, if transmissions on bus system 1 (FIG. 3) during the data phase exhibit a comparatively high transmission rate, for example, bit rate. In some specific embodiments, the connection of predefinable resistance R between bus terminals 12a, 12b outside the data phase may be omitted, even if the first predefinable condition is present. This is the case, for example, in specific embodiments in which an arbitration phase taking place outside the data phase, in particular, before the data phase, which regulates, in particular, a bus access, provides a comparatively low transmission rate. With the comparatively low transmission rate of the arbitration phase, the bus oscillations invariably undesirable per se do not interfere to such a degree with the data transmission as is the case during a data phase having a comparatively high transmission rate. In other words, the connection of the predefinable resistance in some specific embodiments may take place specifically in such operating phases (for example, data phase), in which the connection is particularly useful for the signal transmission. According to further specific embodiments, no connection of the predefinable resistance may accordingly take place outside these operating phases, so that outside these operating phases, an impedance of bus terminals 12a, 12b remains unchanged.

In some specific embodiments of the present invention, a piece of information relating to the presence or absence of a data phase may be provided by a CAN controller not depicted.

Figure 5B:
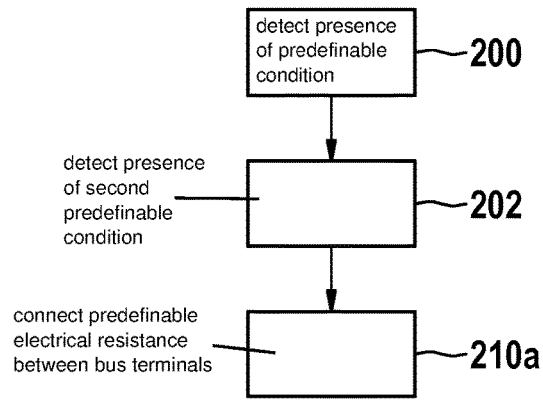
FIGS. 5b, 5C each show a simplified flow chart of a method according to one further specific embodiment of the present invention.

FIG. 5B shows a simplified flow chart of a further specific embodiment of the present invention. In step 200, the presence of the first predefinable condition is detected with the aid of detection device 16 (FIG. 3). In subsequent step 202, the presence of the second predefinable condition is detected with the aid of detection device 16 (FIG. 3), and in step 210a (FIG. 5B) predefinable electrical resistance R is connected between bus terminals 12a, 12b, for example, while activating resistance device 17 with the aid of control signal 16a (FIG. 3).

In further specific embodiments of the present invention, a receiving unit 18, cf. FIG. 3, is provided for receiving a bus receive signal BE from bus terminals 12a, 12b and for outputting a received output signal RxD (or a pre-stage thereof, for example, a differential signal) as a function of a bus receive signal BE. In this way, signals received via bus system 1, the receive signals BE, may be received by transceiver device 10.

In further specific embodiments of the present invention, it is provided that detection device 16 is designed to detect the presence of a third predefinable condition, the third predefinable condition including at least one of the following elements: a) a change of state of bus receive signal BE from a driven state into a non-driven state, b) a falling edge of a differential signal derived from the bus receive signal with the aid of the receiving unit, c) a rising edge of received output signal RxD, the transceiver device 10 being designed to interconnect first and second bus terminals 12a, 12b via predefinable electrical resistance R (FIG. 8) for the predefinable first period of time if at least the first predefinable condition and the third predefinable condition are present. This enables a particularly reliable activation of predefinable resistance R in such phases in which the undesirable bus oscillations may occur. For example, it may be deduced from a change of state of bus receive signal BE from the driven into the non-driven state and the simultaneous presence of the first predefinable condition (for example, rising edge of transmission input signal TxD), that an edge change of transmission input signal TxD with respect to the transceiver device was desired and the edge change was also actually implemented by transmitting unit 14 on bus terminals 12a, 12b. This results in a high robustness against interference pulses and glitches in real systems.

Comparable pieces of information may be ascertained in further specific embodiments from the falling edge of a differential signal (for example, characterizing a potential difference between bus terminals 12a, 12b) derived from bus receive signal BE with the aid of receiving unit 18 and/or from a rising edge of the received output signal.

In further specific embodiments of the present invention, it is also possible that transceiver device 10 is designed to interconnect first and second bus terminals 12a, 12b via predefinable electrical resistance R for the predefinable first period of time if the first predefinable condition and the second predefinable condition and the third predefinable condition are present, thus, all three predefinable conditions are present.

Figure 5C:
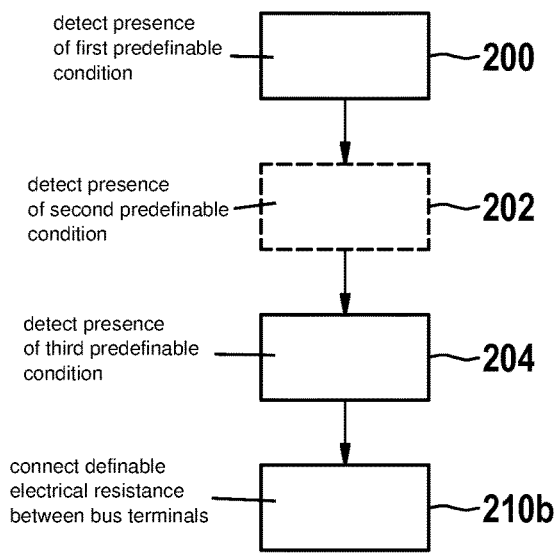

FIG. 5C shows a simplified flow chart of one further specific embodiment of the present invention. In step 200, the presence of the first predefinable condition is detected with the aid of detection device 16 (FIG. 3). In subsequent optional step 202, the presence of the second predefinable condition is detected with the aid of detection unit 16 (FIG. 3), in subsequent step 204, the presence of the third predefinable condition is detected with the aid of detection device 16 (FIG. 3), and in step 210b (FIG. 5C) predefinable electrical resistance R is connected between bus terminals 12a, 12b, for example, while activating resistance device 17 with the aid of control signal 16a (FIG. 3).

In further preferred specific embodiments of the present invention, detection device 16 includes at least one AND gate 16b for linking multiple signals characterizing in each case at least one predefinable condition, for example, for linking transmission input signal TxD and a control signal not depicted in FIG. 3 for the sake of clarity, which signals the presence of a data phase (for example, in terms of a second predefinable condition).

Figure 4:
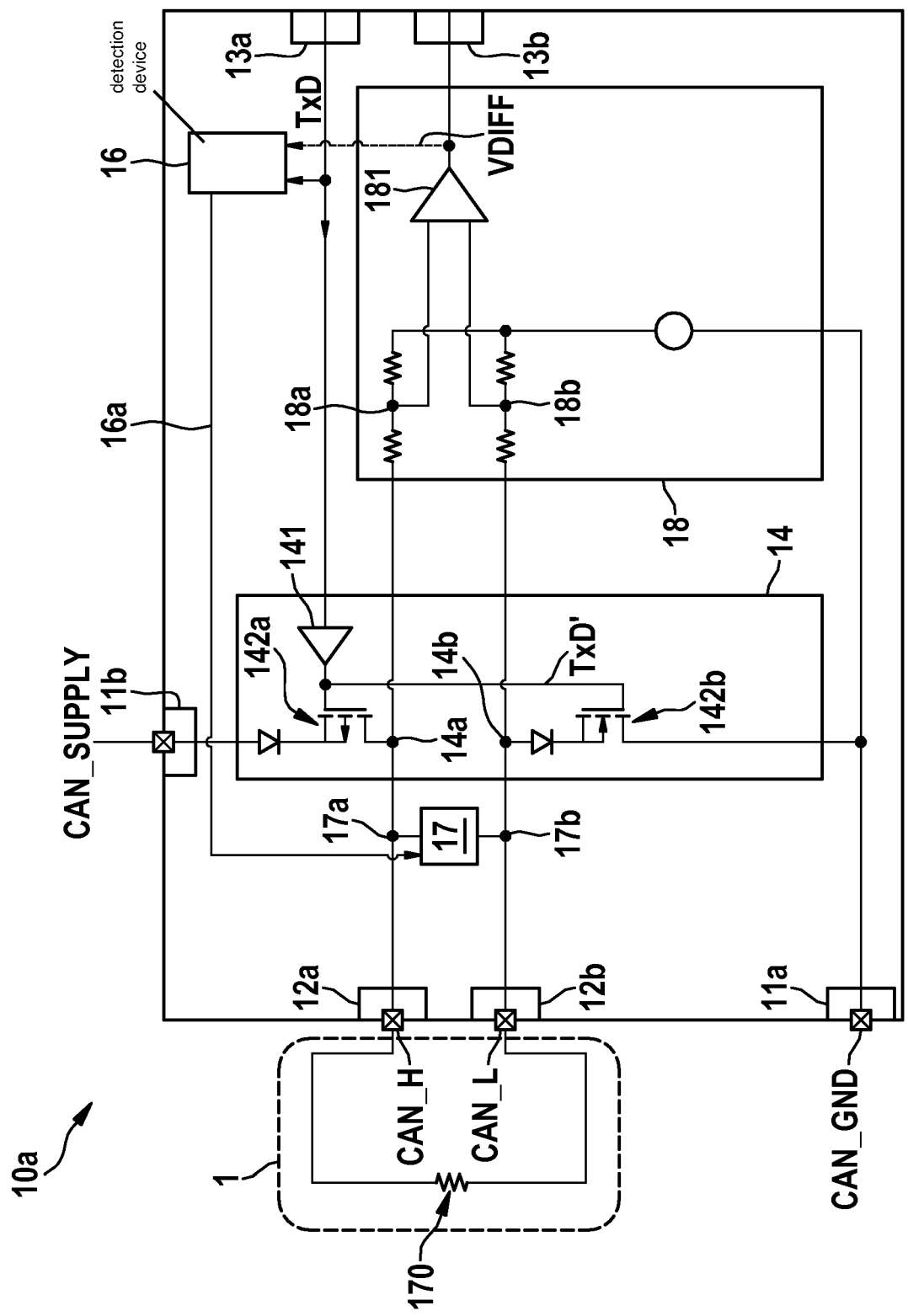
FIG. 4 schematically shows a block diagram of a transceiver device according to one further specific embodiment of the present invention.

FIG. 4 schematically shows a block diagram of a transceiver 10a according to one further specific embodiment of the present invention which, in the present case, is designed, for example, for the operation on a bus system 1 designed as a CAN FD bus system. Essentially only the differences compared to configuration 10 according to FIG. 3 are described below. Transceiver device 10a is connected via a terminal 11a to a first reference potential CAN_GND, which is a ground potential, for example. Transceiver 10a is connected via a terminal 11b to a second reference potential CAN_SUPPLY, which is a reference potential of, for example, +5 volts, corresponding to an operating voltage, for example.

Transmission unit 14 includes a transmission signal driver 141, which generates an output signal for activating the two semiconductor switches 142a, 142b as a function of transmission input signal TxD fed to it. As is apparent from FIG. 4, first terminal 14a of transmitting unit 14 via which transmission unit 14 is connected to first bus terminal 12a, may be set at an electrical potential as a function of second reference potential CAN_SUPPLY upon corresponding activation of first semiconductor switch 142a by transmission input signal TxD. Similarly, second terminal 14b of transmitting unit 14, via which transmitting unit 14 is connected to second bus terminal 12b, may be set at an electrical potential as a function of first reference potential CAN_GND upon corresponding activation of first semiconductor switch 142b. This operating state of transmitting unit 14 is therefore also referred to as a driven operating state of transmitting unit 14. A non-driven operating state of transmitting unit 14 accordingly results when relevant terminals 14a, 14b, or 12a, 12b are not set at the aforementioned potentials by semiconductor switches 142a, 142b. This state may also be referred to as a high-impedance state of transmitting unit 14.

In the configuration described by way of example in FIG. 4, the method according to FIG. 5A (or 5B or 5C) may, for example, also be carried out. In this specific embodiment of the present invention, detection device 16 accordingly detects, for example, a rising edge of transmission input signal TxD or of a signal TxD' derived therefrom, as it is obtained, for example, at the output of transmission signal driver 141 as a function of transmission input signal TxD, as the presence of the first predefinable condition. Transceiver device 10a or detection device 16 may then activate resistance device 17 in terms of connecting resistance R (FIG. 8) between bus terminals 12a, 14b, again for a predefinable first period of time.

In preferred specific embodiments of the present invention, the predefinable first period of time is between 40 ns (nanoseconds) and approximately 150 ns.

Receiving unit 18 includes a first terminal 18a and a second terminal 18b. Receiving unit 18 is connected via these terminals 18a, 18b to bus terminals 12a, 12b. A receiving comparator 181 transforms the differential bus signal present at terminals 18a, 18b in a conventional manner to a differential voltage or to differential signal VDIFF. In some specific embodiments of the present invention, differential signal VDIFF is feedable to detection device 16 so that the latter is able to check, among other things, as a function thereof, the presence of a corresponding predefinable condition as previously described above. Differential signal VDIFF may also be considered to be an analogous differential voltage between the CAN bus lines CAN_H and CAN_L. In this case, VDIFF=CAN_H−CAN_L. Differential voltage VDIFF is, for example, 0V for a recessive bit and typically 2V for a dominant bit.

Various parameters of transceiver device 10, 10a according to the specific embodiments are described below with reference to FIGS. 6A through 6E. For purposes of illustration, no connection of predefinable resistance R (FIG. 8) takes place in the operating cases depicted in FIGS. 6A through 6E, between bus terminals 12a, 12b, consequently there is no attenuation of bus oscillations undesirable per se according to the specific embodiments.

Figure 6:
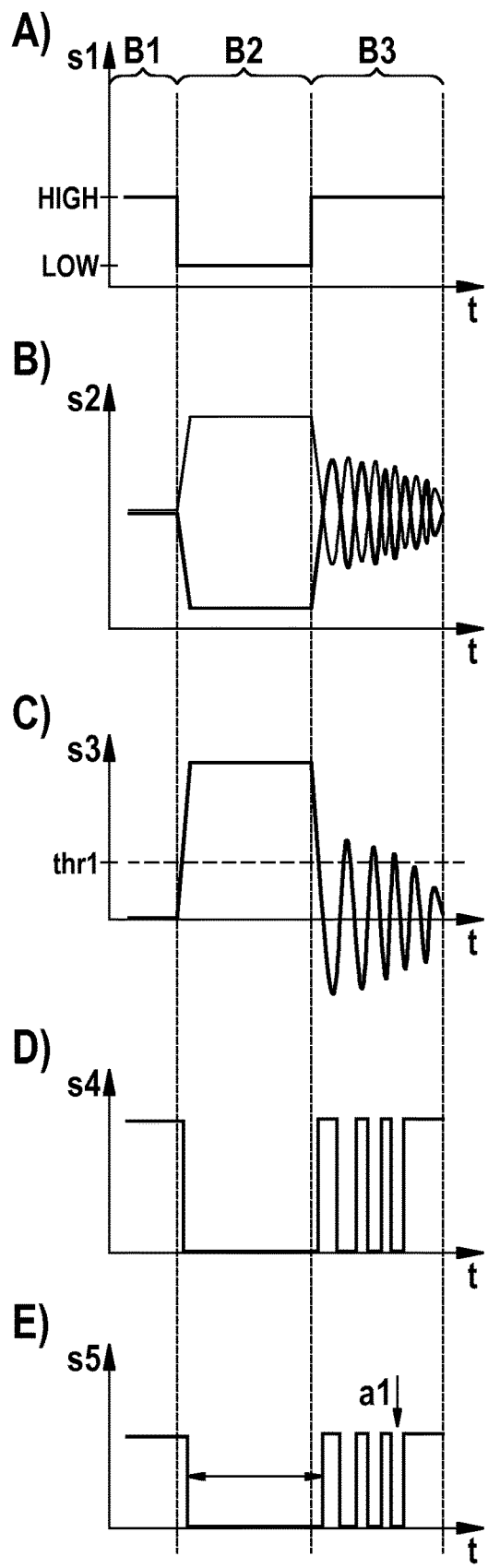
FIGS. 6A through 6E schematically show one temporal profile each of parameters according to one specific embodiment of the present invention, FIGS. 7A through 7E schematically show one temporal profile each of parameters according to one further specific embodiment of the present invention.

First signal s1 depicted in FIG. 6A represents a temporal profile of transmission input signal TxD (FIGS. 3, 4), as it is feedable to transmitting unit 14 for controlling its operating state. In a first time domain B1 (FIG. 6A) and a third time domain B3, transmission input signal s1, which is generally a logic signal, exhibits a HIGH state. In contrast, transmission input signal s1 in a second time domain B2 situated between first time domain B1 and third time domain B3 exhibits a LOW state. Thus, transmitting unit 14 is in a driven state in second time domain B2, and in time domains B1, B3, transmitting unit 14 is in each case in a non-driven state. Domains B1, B3 also characterize a so-called recessive bus state, and domain B2 characterizes a so-called dominant bus state.

FIG. 6B shows bus signals s2 present at bus terminals 12a, 12b. It is clearly apparent that in the transition from the dominant bus state, domain B2, to the recessive bus state, domain B3, undesirable bus oscillations occur, which impede an evaluation of the bus signals.

FIG. 6C shows a third signal s3, which characterizes the temporal profile of differential signal VDIFF at the output of receiving comparator 181, and a receiving threshold thr1 of, for example, approximately 0.7 V. As is apparent, bus oscillations in third domain B3 depicted in FIG. 6B result in comparable oscillations of differential signal VDIFF or s3 in FIG. 6C.

FIG. 6D shows a digital signal s4 ascertained as a function of differential signal VDIFF and of receiving threshold thr1, which exhibits corresponding signal fluctuations in third temporal domain B3 between a HIGH state and LOW state.

FIG. 6E shows a signal s5, which is optionally ascertainable from digital signal s4 according to FIG. 6D, for example, using a received signal driver not shown (situated, for example, in FIG. 4 to the right of the output of receiving comparator 181), which is optionally also able to carry out a level adjustment. Signal s5 in some specific embodiments may also be provided as a CAN-"RxD" signal or received output signal at a terminal 13b (FIG. 4) for units situated downstream from transceiver device 10a (for example, CAN controller not shown). The CAN controller may, for example, also provide transmission input signal TxD at terminal 13a. Arrow a1 in FIG. 6E indicates a sampling point in time. It is apparent that the undesirable bus oscillations interfere with a signal evaluation at sampling point in time a1.

A comparable change of state of transmission input signal s1 in domains B1, B2, B3 is described below with reference to FIGS. 7A through 7E, in contrast to FIGS. 6A through 6E, but advantageous in this case, the principle according to the specific embodiments being used. As is apparent from FIG. 7B, bus signals s2 thus exhibit only a comparatively short "oscillation period" in domain B3, in which a clear evaluation is impeded. This applies similarly to signals s3, s4, s5 of FIGS. 7C, 7D, 7E. It is apparent from FIG. 7E that no undesirable bus oscillations interfere with a signal evaluation at sampling point in time a1.

Figure 7:
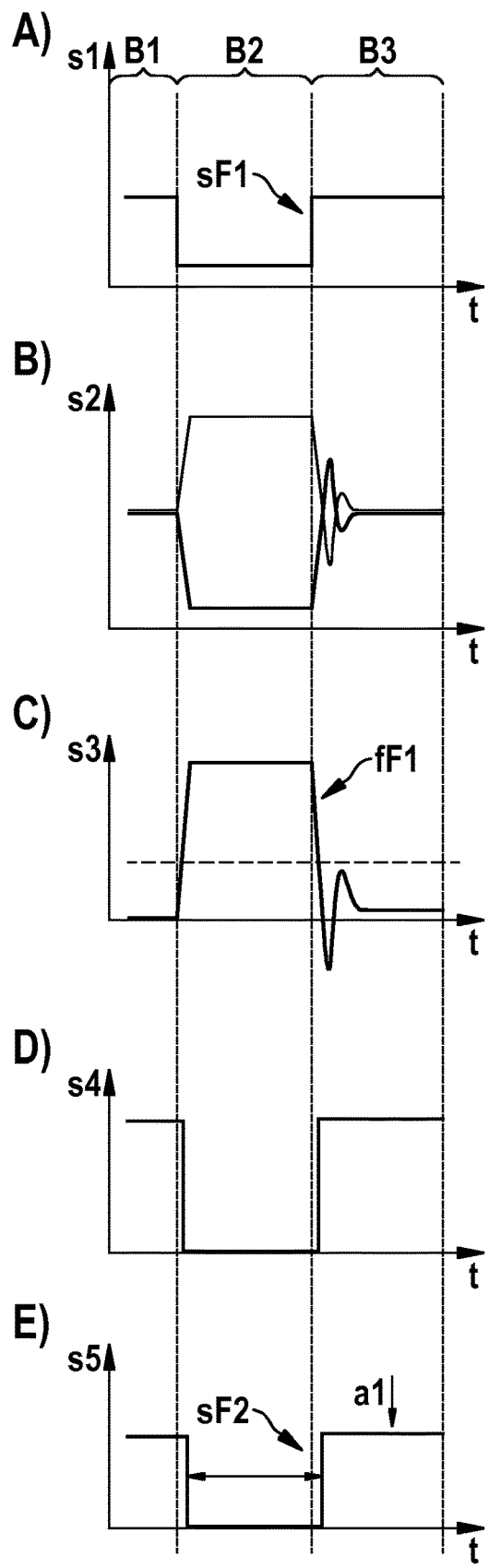
Figure 8:
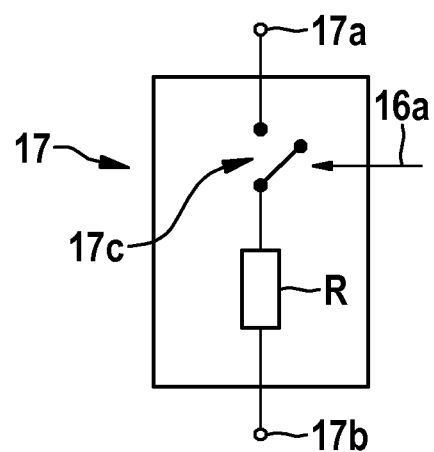
FIG. 8 schematically shows a block diagram of a resistance device according to one specific embodiment.

In FIG. 7A, the rising edge of transmission input signal TxD or s1 is identified with reference numeral sF1, which is usable as a predefinable first condition in terms of the specific embodiment for the activation of attenuation resistance R (FIG. 8). In FIG. 7C, falling edge fF1 of differential signal s3 is shown, which is usable as a predefinable third condition in terms of the specific embodiments for the activation of attenuation resistance R (FIG. 8). In FIG. 7E, rising edge sF2 of received output signal RxD or s5 is shown, which is usable as a predefinable third condition in terms of the specific embodiments for the activation of attenuation resistance R (FIG. 8).

The features according to the specific embodiments is not limited to the application in CAN bus systems or CAN FD bus systems, but is usable, for example, also in LVDS bus systems or in general in all bus systems having dominant and recessive bus states.

What is claimed is:

1. A transceiver device for a bus system, comprising:
   a first bus terminal for connection to a first signal line of the bus system;
   a second bus terminal for connection to a second signal line of the bus system;
   a transmitting unit configured to output a bus transmission signal to the first bus terminal and the second bus terminal;
   an input terminal for receiving a transmission input signal, wherein a rising edge of the received transmission signal switches the transmitting unit from (a) a driven state in which a first switch of the transmitting unit connects the first signal line to a first voltage source at a first reference potential and a second switch of the transmitting unit connects the second signal line to a second voltage source at a second reference potential that is different than the first reference potential to (b) a non-driven state in which the first and second signal lines are not connected to the first and second voltage sources by the first and second switches;
   a receiving unit configured to detect respective voltage levels on each of the first and second signal lines and output a differential signal characterizing a difference between the detected respective voltage levels; and
   a detection device configured to:
      detect an ANDed device state in which there is detection of an ANDed presence of both (a) a first state, which is presence (1) of the rising edge of the received transmission signal switching the transmitting unit from the driven state to the non-driven state or (2) of a signal generated by the transmitting unit in response to the rising edge of the received transmission signal and (b) a second state, which is of a falling edge of the differential signal; and
      respond to satisfaction of a predefined condition that the ANDed presence is detected by interconnecting the first bus terminal and the second bus terminal via a predefinable electrical resistance for a predefinable period of time.

2. The transceiver device as recited in claim 1, wherein the ANDed presence, which is detected, is additionally of presence of data phase in which a data frame is emittable using the transmitting unit, and not presence of an arbitration phase.

3. The transceiver device as recited in claim 1, wherein:
the respective voltages detected by the receiving unit are of a received bus receive signal obtained via the first bus terminal and the second bus terminal; and
the receiving unit is configured to output the differential signal from the transceiver device via an output terminal of the transceiver device, the detection device performing the detection of the ANDed device state using a connection of the detection device to a line from the receiving unit to the output terminal and a connection of the detection device to a line from the input terminal to the transmitting unit.

4. The transceiver device as recited in claim 1, wherein the predefinable electrical resistance has a value between 40 ohms and 200 ohms.

5. The transceiver device as recited in claim 1, wherein the predefinable electrical resistance has a value between 80 ohms and 160 ohms.

6. The transceiver device as recited in claim 1, wherein the predefinable electrical resistance has a value 100 ohms and 140 ohms.

7. The transceiver device as recited in claim 1, wherein the predefinable electrical resistance has a value of 120 ohms.

8. The transceiver device as recited in claim 1, wherein the detection device includes at least one AND gate for linking signals by which detection device detects the ANDed presence.

9. A user station for a bus system, comprising:
a transceiver device including:
a first bus terminal for connection to a first signal line of the bus system;
a second bus terminal for connection to a second signal line of the bus system;
a transmitting unit configured to output a bus transmission signal to the first bus terminal and the second bus terminal;
an input terminal for receiving a transmission input signal, wherein a rising edge of the received transmission signal switches the transmitting unit from (a) a driven state in which a first switch of the transmitting unit connects the first signal line to a first voltage source at a first reference potential and a second switch of the transmitting unit connects the second signal line to a second voltage source at a second reference potential that is different than the first reference potential to (b) a non-driven state in which the first and second signal lines are not connected to the first and second voltage sources by the first and second switches;
a receiving unit configured to detect respective voltage levels on each of the first and second signal lines and output a differential signal characterizing a difference between the detected respective voltage levels; and
a detection device configured to:
detect an ANDed device state in which there is detection of an ANDed presence of both (a) a first state, which is presence (1) of the rising edge of the received transmission signal switching the transmitting unit from the driven state to the non-driven state or (2) of a signal generated by the transmitting unit in response to the rising edge of the received transmission signal and (b) a second state, which is of a falling edge of the differential signal; and
respond to satisfaction of a predefined condition that the ANDed presence is detected by interconnecting the first bus terminal and the second bus terminal via a predefinable electrical resistance for a predefinable period of time.

10. A bus system, comprising:
a bus line which includes a first signal line and a second signal line; and
at least two user stations, at least one of the at least two user stations including a transceiver device, the transceiver device including:
a first bus terminal for connection to the first signal line of the bus system;
a second bus terminal for connection to the second signal line of the bus system;
a transmitting unit configured to output a bus transmission signal to the first bus terminal and the second bus terminal;
an input terminal for receiving a transmission input signal, wherein a rising edge of the received transmission signal switches the transmitting unit from (a) a driven state in which a first switch of the transmitting unit connects the first signal line to a first voltage source at a first reference potential and a second switch of the transmitting unit connects the second signal line to a second voltage source at a second reference potential that is different than the first reference potential to (b) a non-driven state in which the first and second signal lines are not connected to the first and second voltage sources by the first and second switches;
a receiving unit configured to detect respective voltage levels on each of the first and second signal lines and output a differential signal characterizing a difference between the detected respective voltage levels; and
a detection device configured to:
detect an ANDed device state in which there is detection of an ANDed presence of both (a) a first state, which is presence (1) of the rising edge of the received transmission signal switching the transmitting unit from the driven state to the non-driven state or (2) of a signal generated by the transmitting unit in response to the rising edge of the received transmission signal and (b) a second state, which is of a falling edge of the differential signal; and
respond to satisfaction of a predefined condition that the ANDed presence is detected by interconnecting the first bus terminal and the second bus terminal via a predefinable electrical resistance for a predefinable period of time.

11. A method for operating a transceiver device for a bus system, the transceiver device including (i) a first bus terminal for connection to a first signal line of the bus system, (ii) a second bus terminal for connection to a second signal line of the bus system, (iii) a transmitting unit configured to output a bus transmission signal to the first bus terminal and the second bus terminal, (iv) an input terminal for receiving a transmission input signal, wherein a rising edge of the received transmission signal switches the transmitting unit from (a) a driven state in which a first switch of the transmitting unit connects the first signal line to a first voltage source at a first reference potential and a second switch of the transmitting unit connects the second signal line to a second voltage source at a second reference potential that is different than the first reference potential to (b) a non-driven state in which the first and second signal lines are not connected to the first and second voltage sources by the first and second switches, (v) a receiving unit configured to detect respective voltage levels on each of the first and second signal lines and output a differential signal characterizing a difference between the detected respective voltage levels, and (vi) a detection unit, the method comprising the following steps:

detecting, by the detection device, an ANDed device state in which there is detection of an ANDed presence of both (a) a first state, which is presence (1) of the rising edge of the received transmission signal switching the transmitting unit from the driven state to the non-driven state or (2) of a signal generated by the transmitting unit in response to the rising edge of the received transmission signal and (b) a second state, which is of a falling edge of the differential signal; and responding, by the detection device, to satisfaction of a predefined condition that the ANDed presence is detected by interconnecting the first bus terminal and the second bus terminal via a predefinable electrical resistance for a predefinable period of time.

12. The method as recited in claim 11, wherein the ANDed presence, which is detected, is additionally of presence of a data phase in which a data frame is emittable using the transmitting unit and not presence of an arbitration phase.

13. The method as recited in claim 11, wherein:

the respective voltages detected by the receiving unit are of a received bus receive signal obtained via the first bus terminal and the second bus terminal;

the receiving unit is configured to output the differential signal from the transceiver device via an output terminal of the transceiver device; and the detection of the ANDed device state is performed using a connection of the detection device to a line from the receiving unit to the output terminal and a connection of the detection device to a line from the input terminal to the transmitting unit.

* * * * *